May 2, 1967  E. G. NACHBAR  3,316,669
EDUCATIONAL DEVICE
Filed Sept. 8, 1964
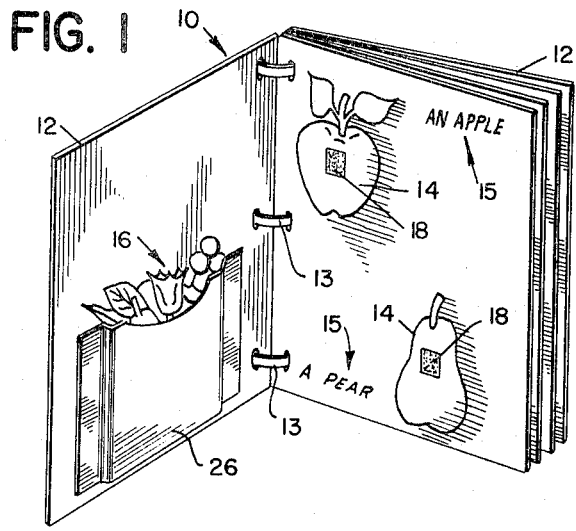
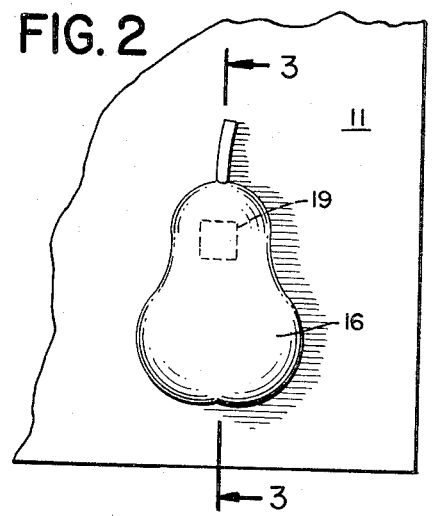
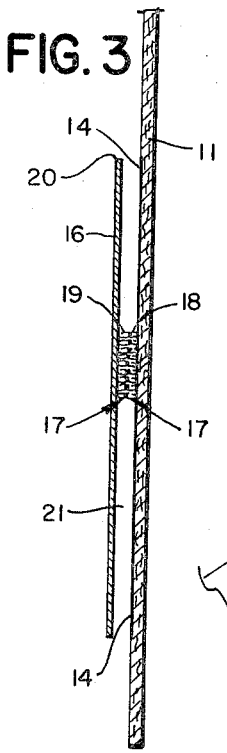
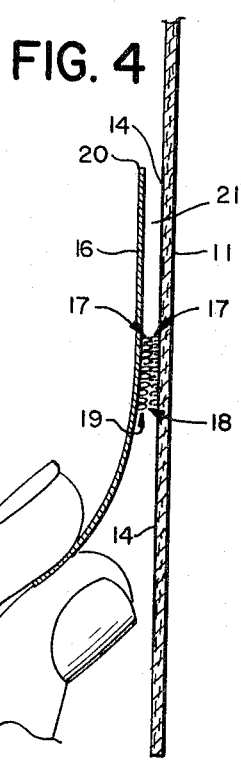
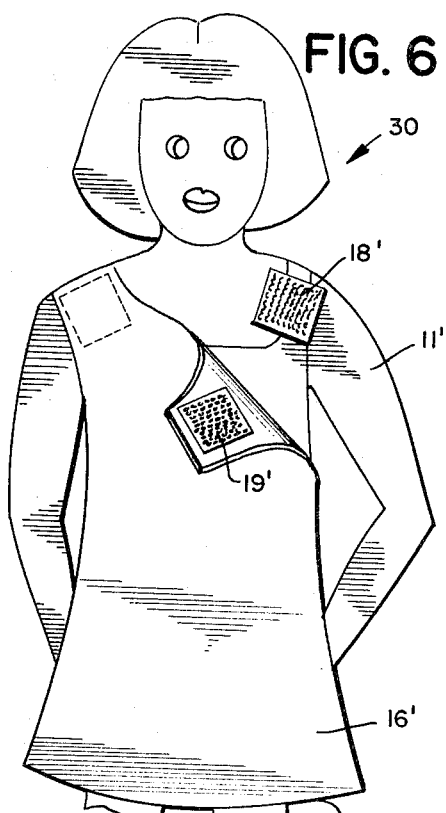
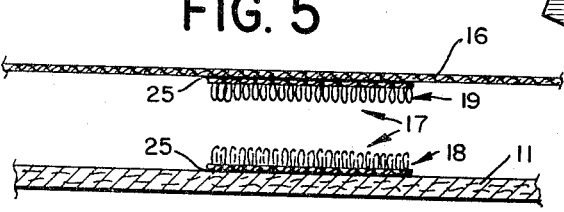
INVENTOR.
EDITH G. NACHBAR
BY Mandeville & Schweitzer
ATTORNEYS

3,316,669
EDUCATIONAL DEVICE
Edith G. Nachbar, Brooklyn, N.Y., assignor of fifty percent to Peter Goetz
Filed Sept. 8, 1964, Ser. No. 394,901
3 Claims. (Cl. 40—142)

The present invention relates to educational devices and more particularly to books and the like having removable and interchangeable elements incorporated therewith.

In the production of educational devices having removable and interchangeable articles associated therewith, especially children's books, durability and facility of use are two of the more important criteria that have been constantly sought. Therefore, as an important aspect of the invention, a new and improved combination of elements has been devised to provide a durable and simply useable educational device.

Specifically, the invention includes a relatively rigid base sheet, which is typically a page of a book, but may alternately take the form of a two-dimensional object such as a doll, for example, and a superimposed, relatively flexible, shaped attachable article. The form of the attachable article is dependent upon the specific function or information desired to be taught, and will be related to the form of the base sheet, itself, or to indicia carried by the base sheet. Thus, for example, the attachable article may be in the shape of a predetermined object, a piece of fruit, and article of clothing or the like, which is placed in registration with or superimposition with the base sheet in association with a corresponding outline or other indication of the object.

As an important aspect of the invention, the attachable article is removably and interchangeably secured to the base sheet by means of readily reuseable, extremely durable, two-piece fastening tapes, commercially available under the trade designation of "Velcro." Such a fastening means normally include a strip having hooks formed thereon and a strip having loops formed thereon, which hooks and loops may be joined by the application thereto of slight pressure to unite the strips, and which may be separated by a prying movement of the strips to release one from the other. In accordance with the invention, relatively small pieces of Velcro fastening tape are positioned and adhered well inwardly of at least certain free edges of the attachable article, which may then be removably secured to a similarly sized mating section of Velcro tape adhered to the base sheet in association with predetermined indicia corresponding to and representative of the attachable article. This novel and advantageous structure permits easy grasping of the overlying article, especially by a child, for prying it loose and freeing it from the bottom sheet.

For a more complete understanding of the principles of the invention and its attendant advantages, reference should be made to the following detailed description taken in conjunction with the accompanying drawing, in which FIG. 1 is a perspective view of a children's book embodying the principles of the present invention;

FIG. 2 is an enlarged, fragmentary elevational view of a page of the book shown in FIG. 1;

FIG. 3 is a cross-sectional view taken along line 3—3 of FIG. 2;

FIG. 4 is a cross-sectional view of a top sheet in the process of being manually removed from a base sheet in accordance with the principles of the invention;

FIG. 5 is an enlarged, cross-sectional view of the hooked and looped fastening tapes employed in the illustrated embodiments of FIGS. 1 and 6; and FIG. 6 is an elevational view of a two-dimensional doll embodying the principles of the invention.

Referring to FIG. 1, a preferred embodiment of the invention is in the form of a children's book 10, including a plurality of relatively rigid base sheet pages 11, typically made from paperboard or the like, disposed between cover members 12. Suitable binders such as rings 13 may be employed to maintain the base sheets 11 in book form. As shown in FIG. 1, the base sheet includes a predetermined indicia in the form of a graphic representation 14, which may additionally include a predetermined color, and/or written designation 15. Advantageously, more than one indicia is included per page to present a choice to the user on each page as well as among all the pages, the educational purpose of which choice will be understood.

In accordance with the invention, a plurality of shaped two-dimensional articles 16 are formed from a relatively flexible sheet material, most advantageously a light, durable fabric, and are specifically formed to correspond to the indicia 14, 15 on the base sheets 11. As an important specific aspect of the invention, relatively small pieces of plastic fastening tape 17 (FIG. 5) having mating hooked and looped strips 18, 19, respectively, are employed to removably and interchangeably secure the articles to appropriate areas of the base sheets containing indicia 14, 15 corresponding to the shape of the top sheets. The strips 18, 19 are secured by adhesive 25 or other suitable means, to their supporting sheets 11, 16, respectively. More specifically and as shown clearly in FIGS. 3 and 4, the fastening tapes, which are fabricated from hooked and looped tape material commercially available under the trade name "Velcro," more specific details of which may be had from United States Patents No. 2,717,437 and No. 3,114,951, are located substantially inwardly of the free edges 20 of the attachable articles 16. This advantageous construction accommodates the manual grasping of the overlying top sheet 16, as shown in FIG. 4, and the application of leverage through the flexing thereof to separate the looped "Velcro" strip 19 from the hooked "Velcro" strip, advantageously maintained relatively rigid by the base sheet 11.

In the case of a book or the like, consisting of more than one base sheet or having more than one attaching location, all of the Velcro tapes on the base sheet locations will be of the same type (usually hooked) and all of the attachable articles will carry tapes of the opposite or mating type (i.e. looped).

It is of particular significance in this invention that the area of the Velcro tapes be small relative to the area of the associated attachable articles. This has an important functional advantage in that it enables a child to insert his thumb under a free margin of the flexible article as shown in FIG. 4, and a desirable esthetic advantage in that the attached articles have an attractive, casual appearance and also a somewhat three-dimensional effect because of the spacing 21 between the article and the base sheet.

A pocket 26 is provided on the inside of a cover 12 to hold the preshaped articles 16 when they are not removably attached to the base sheets 11. A child using the book may select a shaped article 16 from the pocket and removably, but securely, adhere it to the page containing proper corresponding indicia. It should be understood that the indicia may be so arranged and designed that a single attachable article may have more than one possible appropriate location in the book, or that more than one article may be appropriate for a single indicia.

Accordingly, if the indicia were to be in the form of an outline of a doll 30, for example, as shown in FIG. 6, the attachable article might take the form of any number of articles of apparel such as a dress 16'. As a more specific aspect of the invention, the base sheet itself may be formed into a predetermined shape as is the case in the embodiment shown in FIG. 6, where a base sheet 11' is actually a two-dimensional doll. All of the attributes of the above-described book 10 are present in this particular embodiment of the invention, thus, for the sake of clarity and brevity, corresponding elements have been given the same reference numerals with the addition of a prime character.

Where the back sheet is a doll or indicia corresponding to a doll, the structure of the invention includes a pair of small-area Velcro tapes located at the shoulder areas of the doll outline and at corresponding areas of the attachable article of clothing. In the assembled combination, the clothing articles are, in effect, suspended from the shoulders, and are free elsewhere, which imparts an attractive, realistic three-dimensional effect to the completed doll.

Educational devices produced in accordance with the principles of the present invention will be unusually durable as well as extremely simple to use. Employment of "Velcro" strips in the inventive manner between a relatively flexible top sheet and a relatively rigid base sheet, provides for manual grasping and removal of the top sheet with a minimum of force and effort, in a manner readily achievable by any child.

It should be understood that the specific structure herein illustrated and described is intended to be representative only, as certain changes may be made therein without departing from the clear teachings of the disclosure. Accordingly, reference should be made to the following appended claims in determining the full scope of the invention.

I claim:
1. An educational device comprising,
   (a) a two-dimensional base supporting sheet including predetermined indicia on the face thereof,
   (b) a first Velcro fastening tape section associated with said indicia and secured to said base sheet,
   (c) a two-dimensional preformed attachable article graphically representative of said first predetermined indicia, and
   (d) a second mating Velcro fastening tape section matably cooperable with said first tape section to effect a temporary union therewith,
   (e) said second tape section being secured to the underside of said preformed article,
   (f) whereby said base sheet and article may be selectively joined in a predetermined spaced relationship by said first and second tape sections,
   (g) at least said second tape section being of substantially limited area relative to the area of said attachable article,
   (h) said spaced relationship of said article to said base sheet being sufficient to provide said combined article and base sheet with a three-dimensional appearance and to define a gap which provides grasping access to said underside of said article.
2. An educational device in accordance with claim 1, in which
   (a) said base sheet is relatively inflexible in comparison with said attachable article, and
   (b) said article is produced from a light, durable fabric.
3. An educational device in accordance with claim 1, in which
   (a) said base sheet includes second predetermined indicia on the face thereof,
   (b) a third Velcro fastening tape section is included in association with said second predetermined indicia, and
   (c) said preformed article is selectively adherable to said first or second tape sections.

References Cited by the Examiner
UNITED STATES PATENTS

| | | | |
|---|---|---|---|
| 364,845 | 7/1887 | Oakley | 35—35.5 X |
| 1,562,225 | 11/1925 | Garman | 35—26 |
| 1,922,229 | 8/1933 | Burke | 40—142 X |
| 2,079,550 | 5/1937 | De Mott | 46—157 |
| 2,093,207 | 9/1937 | Munson | 46—157 |
| 2,946,137 | 7/1960 | Worth et al. | 35—35.5 |
| 3,063,749 | 11/1962 | Struble et al. | 40—142 X |
| 3,181,913 | 5/1965 | Guido | 40—143 X |

EUGENE R. CAPOZIO, *Primary Examiner.*

HERBERT F. ROSS, *Examiner.*

WALTER W. NIELSEN, *Assistant Examiner.*